United States Patent
Furuhata

(10) Patent No.: US 9,939,268 B2
(45) Date of Patent: Apr. 10, 2018

(54) PHYSICAL QUANTITY SENSOR ELEMENT, PHYSICAL QUANTITY SENSOR, ELECTRONIC EQUIPMENT, AND MOVABLE BODY

(71) Applicant: Seiko Epson Corporation, Tokyo (JP)

(72) Inventor: Makoto Furuhata, Matsumoto (JP)

(73) Assignee: Seiko Epson Corporation (JP)

( * ) Notice: Subject to any disclaimer, the term of this patent is extended or adjusted under 35 U.S.C. 154(b) by 194 days.

(21) Appl. No.: 14/844,032

(22) Filed: Sep. 3, 2015

(65) Prior Publication Data

US 2016/0069683 A1 Mar. 10, 2016

(30) Foreign Application Priority Data

Sep. 5, 2014 (JP) .................................. 2014-181048

(51) Int. Cl.
*G01C 19/5747* (2012.01)
*G01C 19/574* (2012.01)

(52) U.S. Cl.
CPC .................................. *G01C 19/574* (2013.01)

(58) Field of Classification Search
CPC ........................ G01C 19/5762; G01C 19/5747
See application file for complete search history.

(56) References Cited

U.S. PATENT DOCUMENTS

| | | | |
|---|---|---|---|
| 6,089,088 A | 7/2000 | Charvet | |
| 6,289,733 B1 | 9/2001 | Challoner et al. | |
| 6,321,598 B1 | 11/2001 | Iwaki et al. | |
| 6,415,663 B1 | 7/2002 | Mochida et al. | |
| 6,766,689 B2 | 7/2004 | Spinola Durante et al. | |
| 6,892,575 B2 | 5/2005 | Nasiri et al. | |
| 6,915,693 B2* | 7/2005 | Kim .................... | G01C 19/5762 73/504.12 |
| 8,443,668 B2 | 5/2013 | Ohms et al. | |
| 8,549,919 B2 | 10/2013 | Gunthner et al. | |
| 8,978,742 B2 | 3/2015 | Lin et al. | |
| 2006/0010978 A1 | 1/2006 | Lee et al. | |
| 2013/0298672 A1* | 11/2013 | Kuhlmann ......... | G01C 19/5747 73/504.12 |

FOREIGN PATENT DOCUMENTS

| | | |
|---|---|---|
| JP | H11-337345 A | 12/1999 |
| JP | 2000-329562 A | 11/2000 |
| JP | 2000-337884 A | 12/2000 |

(Continued)

*Primary Examiner* — John Chapman, Jr.
(74) *Attorney, Agent, or Firm* — Harness, Dickey & Pierce, P.L.C.

(57) ABSTRACT

A physical quantity sensor element is formed into a plane-shape which extends along an XY plane, and is provided with a driving portion which vibrates in a Z-axis direction, a detecting portion which vibrates in an X-axis direction due to Coriolis effect acting on the driving portion, a beam portion which connects the driving portion and the detecting portion, a fixing portion, and a beam portion which connects the detecting portion and the fixing portion, in which a spring constant of the beam portion in the Z-axis direction is smaller than a spring constant of the beam portion in the Z-axis direction, and a spring constant of the beam portion in the Z-axis direction is greater than a spring constant of the beam portion in the X-axis direction.

10 Claims, 10 Drawing Sheets

(56) References Cited

FOREIGN PATENT DOCUMENTS

| JP | 2001-021360 A | 1/2001 |
| JP | 2006-030205 A | 2/2006 |
| JP | 2006-153514 A | 6/2006 |
| JP | 2009-085715 A | 4/2009 |
| JP | 2013-096952 A | 5/2013 |

* cited by examiner

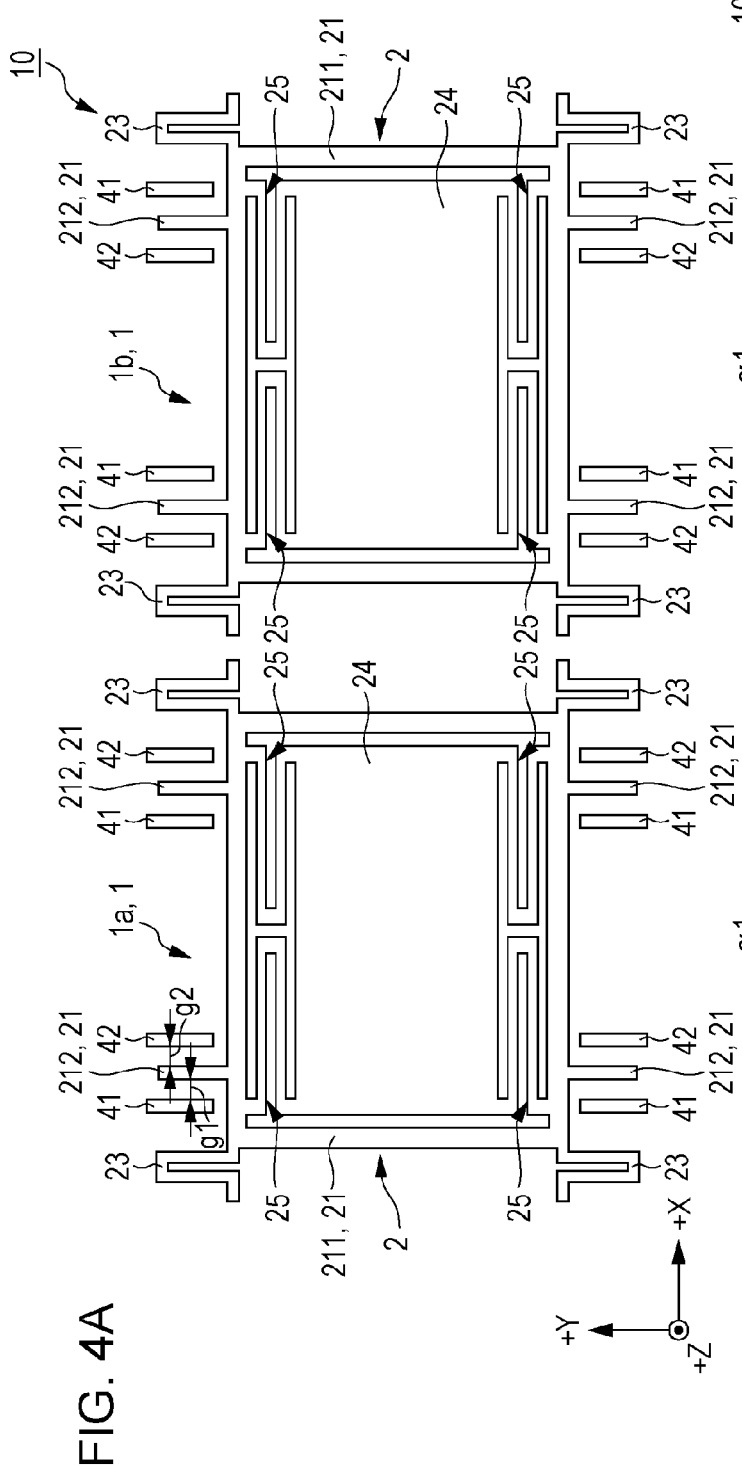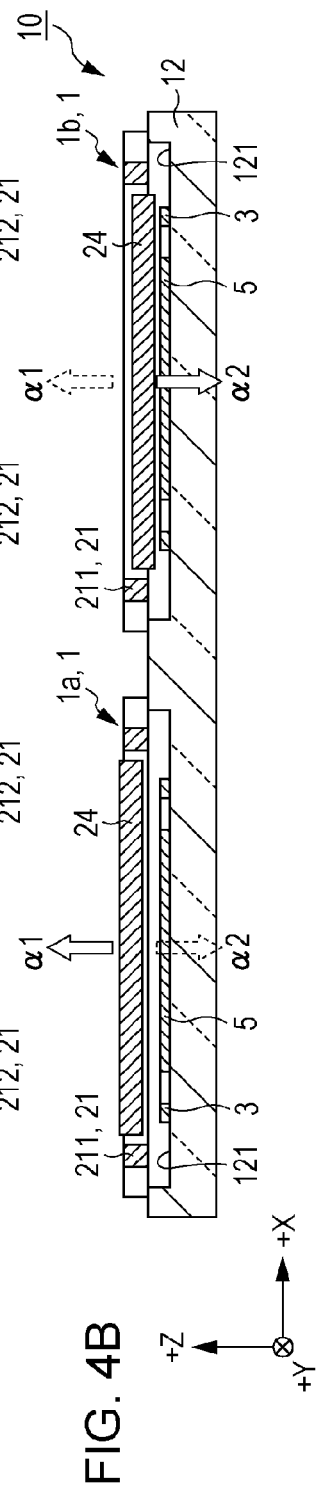
FIG. 4A
FIG. 4B

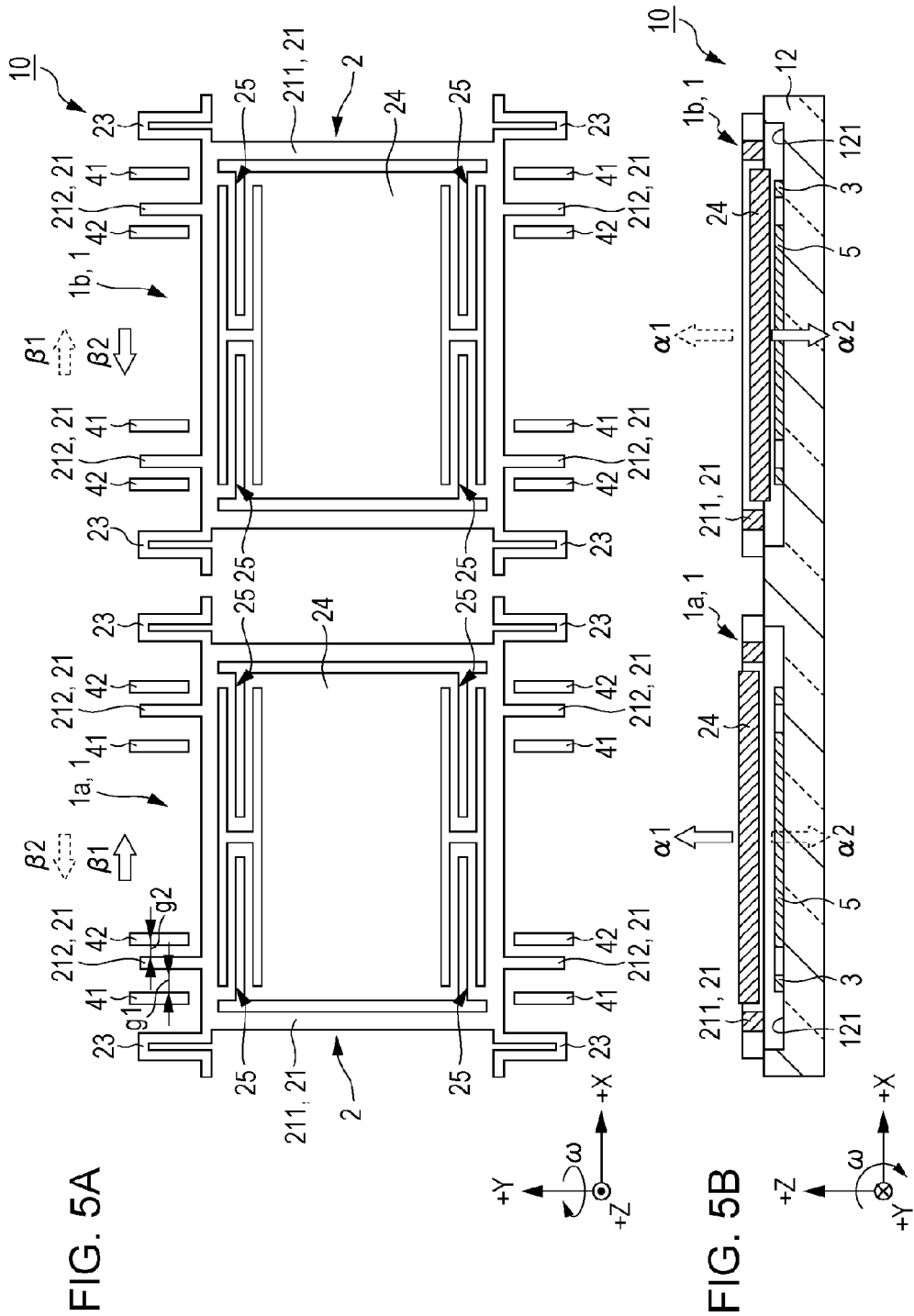

PHYSICAL QUANTITY SENSOR ELEMENT, PHYSICAL QUANTITY SENSOR, ELECTRONIC EQUIPMENT, AND MOVABLE BODY

BACKGROUND

1. Technical Field

The present invention relates to a physical quantity sensor element, a physical quantity sensor, electronic equipment, and a movable body.

2. Related Art

Recently, as a physical quantity sensor element using a silicon micro electro mechanical system (MEMS) technology, for example, a capacitance type gyro sensor element (an angular velocity sensor) for detecting angular velocity has been known (for example, refer to JP-A-2000-337884).

For example, an angular velocity sensor according to JP-A-2000-337884 is provided with a support fixing portion, a first vibrating body (a driving portion) which is supported with respect to the support fixing portion via a first supporting beam, and a second vibrating body (a detecting portion) which is supported with respect to the first vibrating body via a second supporting beam. In the angular velocity sensor, a load vibrating body including the first vibrating body and the second vibrating body vibrates in an X-axis direction (driving vibration). At the time of the driving vibration, in accordance with the action of the angular velocity about a Z-axis which passes through the center of the load vibrating body, the load vibrating body rotates and vibrates (detecting vibration) also in a Y-axis direction by Coriolis effect. In accordance with the detecting vibration, an electrostatic capacity between an interdigital electrode which is provided in the second vibrating body and a fixedly disposed interdigital electrode is changed, and a rotation angular velocity is obtained based on the electrostatic capacity.

However, in the angular velocity sensor according to JP-A-2000-337884, the second vibrating body for detecting vibration is supported by the first vibrating body for driving vibration via the second supporting beam, and thus when unnecessary vibration is generated in a direction different from a desired driving vibration, the unnecessary vibration is transferred to the second vibrating body from the first vibrating body via the second supporting beam, thereby causing deterioration of detection accuracy. For example, a cross-sectional shape of the first supporting beam is supposed to be, for example, a rectangular shape which is an ideal shape; however, the cross-sectional shape may become a parallelogram shape or a trapezoid shape without being the ideal shape due to a processing error in some cases. In this case, when the driving vibration is performed on the first vibrating body in the X-axis direction, due to the influence of the cross-sectional shape of the first supporting beam, the vibration of the first vibrating body includes not only a vibration component in the X-axis direction which is a direction of a desired driving vibration, but also a vibration component corresponding to the unnecessary vibration in the Z-axis direction. At this time, this unnecessary vibration is transferred to the second vibrating body as well, and thus leakage vibration occurs, thereby causing the detection accuracy to be deteriorated.

SUMMARY

An advantage of some aspects of the invention is to provide a physical quantity sensor element having excellent detection accuracy, or a physical quantity sensor which is provided with the physical quantity sensor element, electronic equipment, and a movable body.

The invention can be realized in the following forms or application examples.

Application Example 1

According to this application example of the invention, there is provided a physical quantity sensor element including: a driving portion which vibrates in a first direction along a first axis orthogonal to a reference surface; a detecting portion which vibrates in a second direction along a second axis in the reference surface due to an inertial force acting on the driving portion; a first beam portion which connects the driving portion and the detecting portion with each other; a fixing portion; and a second beam portion which connects the detecting portion and the fixing portion, wherein a spring constant of the first beam portion in the first direction is smaller than a spring constant of the second beam portion in the first direction, and in which a spring constant of the second beam portion in the first direction is greater than a spring constant of the second beam portion in the second direction.

According to the physical quantity sensor element as described above, in the first direction which is a direction of the driving vibration of the driving portion, the first beam portion is likely to be more bent than the second beam portion, and thus it is possible to reduce the transfer of vibration from the driving vibration of the driving portion to the detecting portion and to efficiently excite the driving vibration on the driving portion. In addition, even though the cross-sectional shape of the first beam portion is formed into, for example, a parallelogram shape or a trapezoid shape other than the rectangular shape, the direction in which the unnecessary vibration occurs in the driving portion corresponds to a direction along a third axis orthogonal to the second axis in the reference surface. Thus, although the unnecessary vibration is transferred to the detecting portion from the driving portion, it is possible to reduce the occurrence of detection errors with negligible effect on the detection vibration of the detecting portion. In addition, in the second direction which corresponds to the direction of the detecting vibration of the detecting portion, the second beam portion is likely to be bent, and thus it is possible to efficiently excite detecting vibration on the detecting portion to vibrate. As described, the physical quantity sensor element of the invention has excellent detection accuracy.

Application Example 2

In the physical quantity sensor element according to the application example of the invention, it is preferable that when the spring constant of the first beam portion in the first direction is set to be $k1z$, and the spring constant of the second beam portion in the first direction is set to be $k2z$, a relationship expressed by $k1z/k2z \leq 1/10$ is established.

As such, it is possible to efficiently excite the driving vibration on the driving portion. In addition, it is possible to efficiently reduce the transfer from the driving vibration of the driving portion to the detecting portion.

Application Example 3

In the physical quantity sensor element according to the application example of the invention, it is preferable that a length of the first beam portion is longer than a length of the second beam portion.

As such, with a relatively simple configuration, it is possible that the spring constant of the first beam portion in the first direction is smaller than the spring constant of the second beam portion in the first direction.

Application Example 4

In the physical quantity sensor element according to the application example of the invention, it is preferable that the first beam portion includes a portion which is formed into a meandering shape in planar view when seen from the first direction.

As such, it is possible to efficiently reduce the spring constant of the first beam portion in the first direction. In addition, it is possible to efficiently dispose the first beam portion, and thereby to realize the miniaturization of the physical quantity sensor element.

Application Example 5

In the physical quantity sensor element according to the application example of the invention, it is preferable that the first beam portion includes a first portion which extends along the second axis, and a second portion which extends along a third axis orthogonal to the second axis in the reference surface, and a length of the first portion is longer than a length of the second portion.

As such, it is possible to more efficiently dispose the first beam portion. In addition, the second portion is inclined in accordance with the bending deformation and the twist deformation of the first portion, and thus it is possible to expand the amplitude (displacement in the first direction) of the driving vibration of the driving portion.

Application Example 6

In the physical quantity sensor element according to the application example of the invention, it is preferable that the thickness of the first beam portion is smaller than the thickness of the second beam portion.

As such, with a relatively simple configuration, it is possible that the spring constant of the first beam portion in the first direction is smaller than the spring constant of the second beam portion in the first direction.

Application Example 7

In the physical quantity sensor element according to the application example of the invention, it is preferable that the width of the second beam portion is smaller than the thickness of the second beam portion.

As such, with a relatively simple configuration, it is possible that the spring constant of the second beam portion in the second direction is smaller than the spring constant of the second beam portion in the first direction.

Application Example 8

According to this application example of the invention, there is provided a physical quantity sensor including the physical quantity sensor element of the above-described application example of the invention; and a package which stores the physical quantity sensor element.

As such, it is possible to provide the physical quantity sensor having excellent detection accuracy.

Application Example 9

According to this application example of the invention, there is provided electronic equipment including the physical quantity sensor element of the above-described application example of the invention.

As such, it is possible to provide electronic equipment which includes the physical quantity sensor element having the excellent detection accuracy.

Application Example 10

According to this application example of the invention, there is provided a movable body including the physical quantity sensor element of the above-described application example of the invention.

As such, it is possible to provide the movable body which includes the physical quantity sensor element having excellent detection accuracy.

BRIEF DESCRIPTION OF THE DRAWINGS

The invention will be described with reference to the accompanying drawings, wherein like numbers reference like elements.

FIG. 4A and FIG. 4B are schematic diagrams for illustrating an operation of the physical quantity sensor (in a state in which angular velocity is not added) illustrated in FIG. 1, and FIG. 4A is a plan view and FIG. 4B is a sectional view.

FIG. 5A and FIG. 5B are schematic diagrams for illustrating an operation of the physical quantity sensor (in a state in which angular velocity is added) illustrated in FIG. 1, and FIG. 5A is a plan view and FIG. 5B is a sectional view.

FIG. 7A is a plan view and FIG. 7B is a sectional view.

DESCRIPTION OF EXEMPLARY EMBODIMENTS

Hereinafter, a physical quantity sensor element, a physical quantity sensor, electronic equipment and a movable body of the invention will be described in detail based on preferred embodiments shown in the accompanying drawings.

1. Physical Quantity Sensor

First, an embodiment of the physical quantity sensor (a physical quantity sensor which is provided with a physical quantity sensor element) of the invention will be described.

First Embodiment

Figure 1:
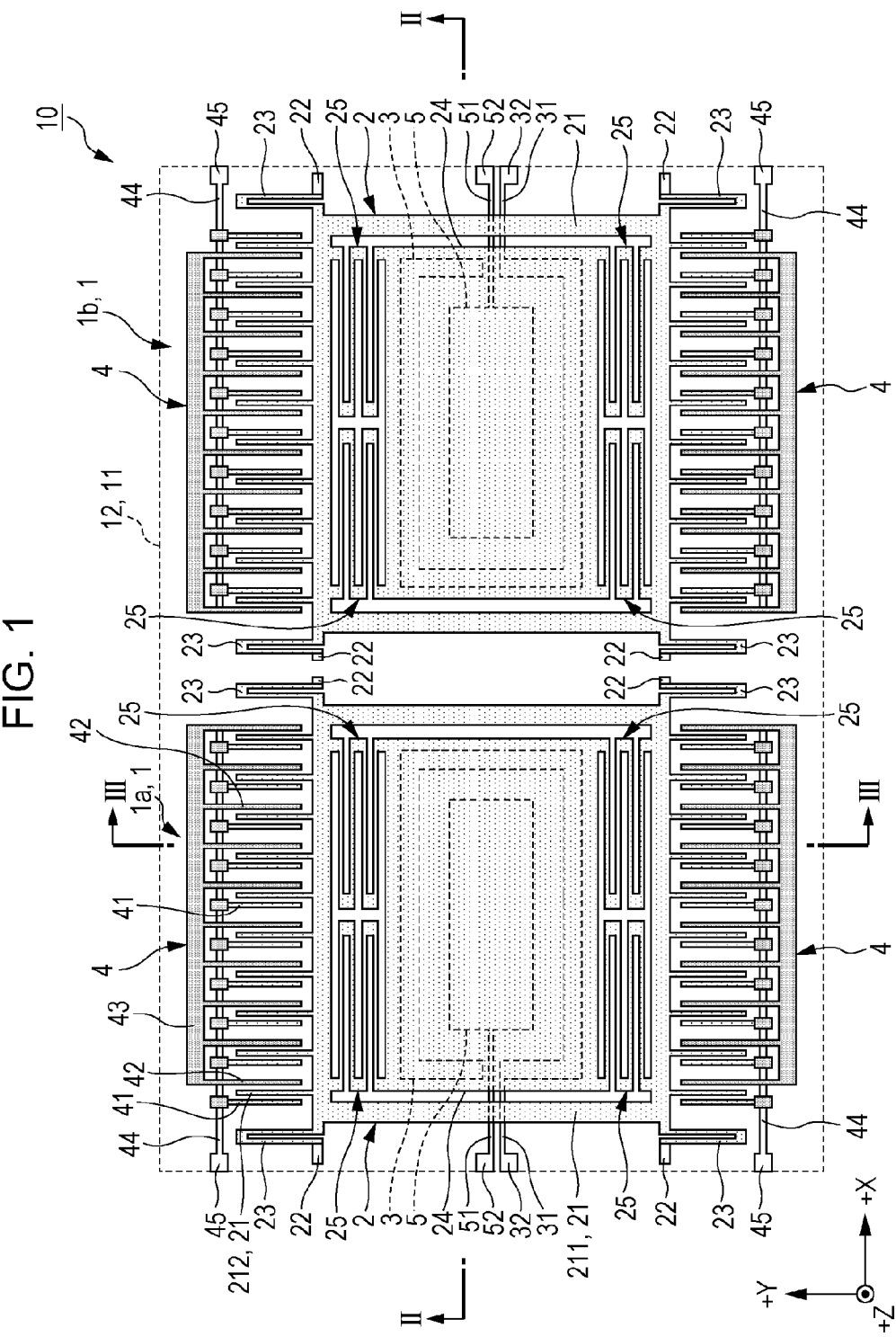
FIG. 1 is a plan view illustrating a physical quantity sensor according to a first embodiment of the invention.
Figure 2:
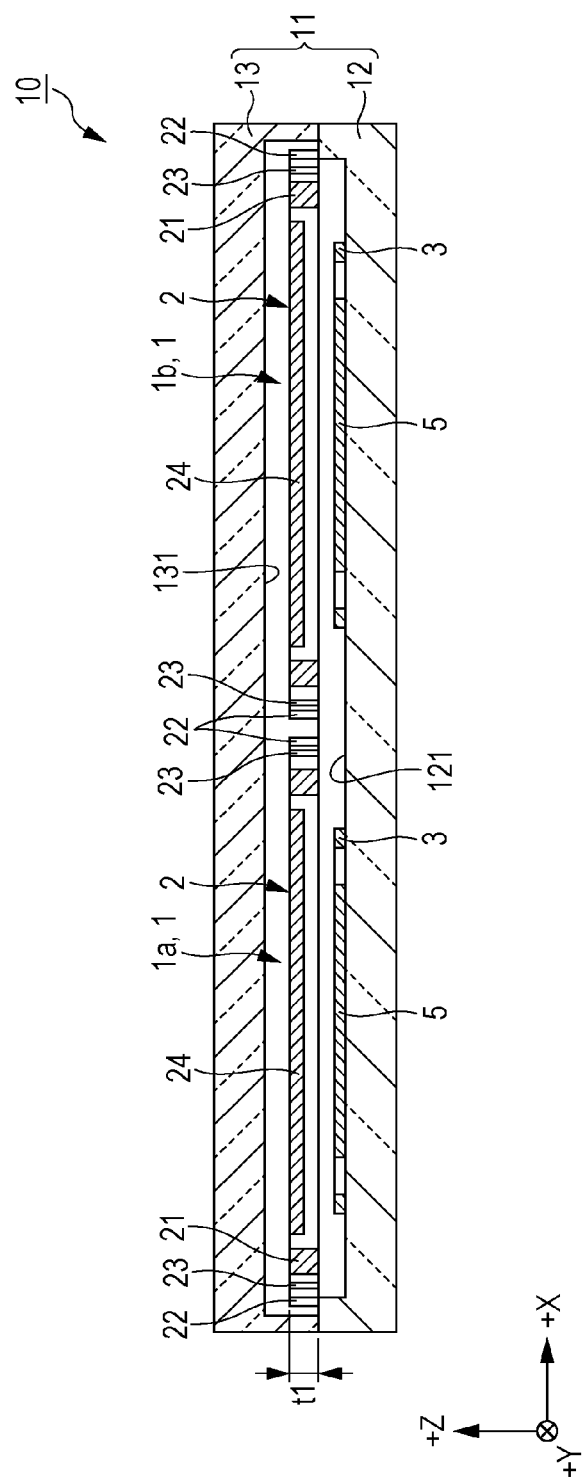
FIG. 2 is a sectional view taken along line IIA-IIA in FIG. 1.
Figure 3:
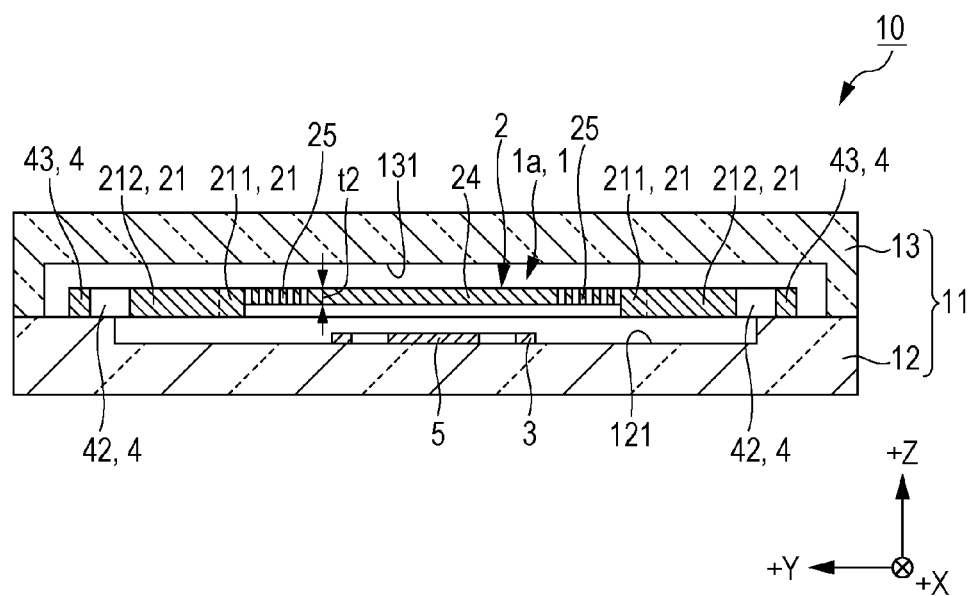
FIG. 3 is a sectional view taken along line IIB-IIB in FIG. 1.

FIG. 1 is a plan view illustrating the physical quantity sensor according to the first embodiment of the invention, FIG. 2 is a sectional view taken along line IIA-IIA in FIG. 1, and FIG. 3 is a sectional view taken along line IIB-IIB in FIG. 1. In addition, FIG. 4A and FIG. 4B are schematic diagrams for illustrating an operation of the physical quantity sensor (a state to which an angular velocity is not added) illustrated in FIG. 1, and FIG. 4A is a plan view and FIG. 4B is a sectional view. FIG. 5A and FIG. 5B is a schematic diagram for illustrating an operation of the physical quantity sensor (a state to which an angular velocity is added) illustrated in FIG. 1, and FIG. 5A is a plan view and FIG. 5B is a sectional view.

Meanwhile, in the drawings, for convenience of explanation, three axes of an X-axis (a third axis), a Y-axis (a second axis), and a Z-axis (a first axis) which are orthogonal to each other are indicated by arrows, and a tip end side of the arrow is set to be "+(positive)", and a base end side is set to be "−(negative)". In addition, in the following description, a direction parallel to the X-axis is referred to as an "X-axis direction", a direction parallel to the Y-axis is referred to as a "Y-axis direction", and a direction parallel to the Z-axis is referred to as a "Z-axis direction". In addition, in the following description, for convenience of explanation, an upper side (a side of the +Z-axis direction) and a lower side (a side of the −Z-axis direction) in FIG. 2 and FIG. 3 are respectively referred to as "up" and "down".

A physical quantity sensor 10 as illustrated in FIG. 1 is a gyro sensor for detecting an angular velocity about the Y-axis. The physical quantity sensor 10 is provided with a physical quantity sensor element 1 which is a gyro element, and a package 11 which stores the physical quantity sensor element 1, as illustrated in FIG. 2 and FIG. 3.

Package

The package 11 is provided with a base substrate 12 for supporting the physical quantity sensor element 1, and a lid member 13 which is bonded to the base substrate 12, and a space for storing the physical quantity sensor element 1 is formed between the base substrate 12 and the lid member 13. Meanwhile, the base substrate 12 may form a portion of the physical quantity sensor element 1.

Each of the base substrate 12 and the lid member 13 is formed into a plane-shape and is disposed along an XY plane (a reference surface) which is a plane including the X-axis and the Y-axis. In addition, a recessed portion 121 which has a function of preventing a vibrating portion (a portion from which a fixing portion 22 of the vibration structure 2 described below is removed) of the physical quantity sensor element 1 from coming in contact with the base substrate 12 is provided on an upper surface (that is, a surface on the side on which the physical quantity sensor element 1 is provided) of the base substrate 12. With this, the base substrate 12 can support the physical quantity sensor element 1 while allowing the physical quantity sensor element 1 to be driven. In addition, a recessed portion 131 which is formed so as to cover the physical quantity sensor element 1 in a non-contact manner on the lower surface (that is, a surface on the side which is bonded to the base substrate 12) of the lid member 13 is provided. With this, it is possible to form a space for storing the physical quantity sensor element 1 between the base substrate 12 and the lid member 13 while allowing the physical quantity sensor element 1 to be driven.

Meanwhile, in the drawings, each of the base substrate 12 and the lid member 13 may be formed of one member, or may be formed of two or more members which are bonded together. For example, the base substrate 12 or the lid member 13 may be formed by bonding a frame-shaped member and a plane-shaped member together.

A bonding method of the base substrate 12 and the lid member 13 is different according to the constituent material of the base substrate 12 and the lid member 13, and thus is not particularly limited, for example, it is possible to use a bonding method by using a bonding material such as an adhesive and a brazing material, and a solid bonding method such as a direct bonding method or an anodic bonding method.

In addition, the constituent material of the base substrate 12 is not particularly limited, but it is preferable to use a material having insulating properties, specifically, it is preferable to use a silicon material having high resistance and a glass material, and it is particularly preferable to use a glass material (for example, borosilicate glass such as Pyrex glass (registered trademark)) containing alkali metal ion (a movable ion). Therefore, when the vibration structure 2 is mainly formed of silicon, it is possible to anodically bond the base substrate 12 and the vibration structure 2.

In addition, the constituent material of the lid member 13 is not particularly limited, for example, it is possible to use the same material as that of the aforementioned base substrate 12.

Each of the base substrate 12 and the lid member 13 can formed by using, for example, a photolithography method and an etching method.

Physical Quantity Sensor Element

The physical quantity sensor element 1 is formed of two physical quantity sensor elements 1a and 1b. The two physical quantity sensor elements 1a and 1b are symmetrically formed in FIG. 2, and thus have the same configuration to each other.

Specifically, each of the physical quantity sensor elements 1a and 1b includes a vibration structure 2, a driving fixed electrode portion 3 for exciting the driving vibration on the vibration structure 2, two detecting fixed electrode portions 4 for detecting the detecting vibration on the vibration structure 2, and an electrode for driving monitor 5 for detecting a driving state of the vibration structure 2. That is, the physical quantity sensor element 1 is provided with two vibration structures 2, two driving fixed electrode portions 3 for exciting the driving vibration on the two vibration structures 2, four detecting fixed electrode portions 4 for detecting the detecting vibration of the two vibration structures 2, and two electrodes for driving monitor 5 for detecting the driving state of the two vibration structures 2. Hereinafter, each portion of the physical quantity sensor elements 1 will be described in order.

Vibration Structure

The vibration structure 2 is provided with a detecting portion 21, the four fixing portions 22 which are fixed to the package 11, a detecting portion 21, four beam portions 23 (second beam portions) which are connected to the four fixing portions 22, a driving portion 24, and four beam portions 25 (first beam portions) which connect the detecting portion 21 and the driving portion 24.

The detecting portion 21, the four fixing portions 22, four beam portions 23, the driving portion 24, and four beam portions 25 of the vibration structure 2 are integrally formed. In addition, as a constituent material of each of the vibration structures 2, for example, it is possible to use silicon to which conductive property is imparted by being doped with an impurity such as phosphorus or boron. In addition, the two vibration structures 2 are collectively formed by processing (for example, an etching process) one substrate (for example, a silicon substrate).

Detecting Portion

The detecting portion 21 of each of the vibration structures 2 is provided with a frame portion 211 and a detecting movable electrode portion 212 which is provided in the frame portion 211.

The frame portion 211 is formed into a frame shape in the planar view (hereinafter, simply referred to as "in planar view") from the Z-axis direction. Specifically, the frame portion 211 is formed of a pair of first portions which extend along the X-axis direction so as to be parallel to each other, and a pair of second portions which extend along the Y-axis direction so as to be parallel to each other by connecting to the end portions of the pair of first portions.

The detecting movable electrode portion 212 is formed of a plurality of electrode fingers which extend along the Y-axis direction from each of the first portions of the aforementioned frame portion 211. Meanwhile, the number of these electrode fingers may be arbitrary without being limited to the number shown in the drawings.

Fixing Portion

The four fixing portions 22 of the vibration structure 2 are bonded and fixed on the upper surface of the base substrate 12 on the outside of the recessed portion 121 of the base substrate 12 in the package 11. The bonding method is different according to a constituent material of the base substrate 12 and the fixing portion 22, and thus is not particularly limited. For example, it is possible to use a solid bonding method such as a direct bonding method or an anodic bonding method.

The four fixing portions 22 are respectively disposed to be spaced from each other at the outside of the detecting portion 21 on the outside of the detecting portion 21 in planar view. In the embodiment, the four fixing portions 22 are disposed at a position corresponding to each of the corner portions (each connecting portion between the first portion and the second portion) of the frame portion 211 of the detecting portion 21 in planar view.

Second Beam Portion

The four beam portions 23 of each of the vibration structures 2 correspond to each of the corner portions of the frame portion 211 of the detecting portion 21 in planar view, and each of four beam portions 23 is connected to the corresponding to detecting portion 21 and the fixing portion 22.

Each of the beam portions 23 is formed into a meandering shape which extends along the X-axis direction while reciprocating in the Y-axis direction, in planar view. With this, it is possible to increase the length of each of the beam portions 23 while still realizing miniaturization. It is possible to easily displace the detecting portion 21 in the X-axis direction in accordance with the bending deformation of each of the beam portions 23 by increasing the length of each of the beam portions 23.

Here, each of the beam portions 23 includes a portion which extends along the Y-axis direction, and a portion which extends along the X-axis direction, but the length of the portion which extends along the Y-axis direction is longer than the length of the portion which extends along the X-axis direction. With this, the bending deformation of each of the beam portions 23 is reduced in the Y-axis direction, and thus it is possible to reduce the displacement of the detecting portion 21 in accordance with the bending deformation of each of the beam portions 23 in the Y-axis direction.

Note that, each of the beam portions 23 may not be formed into the meandering shape as described above, and, for example, may be formed into a shape which extends along the Y-axis direction in planar view.

In addition, the width (the length which extends along the X-axis direction) of each of the beam portions 23 is smaller than the thickness (the length which extends along the Z-axis direction) of each of the beam portions 23. In other words, the thickness of each of the beam portions 23 is larger than the width of each of the beam portions 23. With this, each of the beam portions 23 is likely to be bent and deformed in the X-axis direction, and is not likely to be bent and deformed in the Z-axis direction. That is, the spring constant of each of the beam portions 23 in the Z-axis direction is larger than the spring constant of each of the beam portions 23 in the X-axis direction. For this reason, it is possible to reduce the displacement of the detecting portion 21 in the Z-axis direction while allowing the detecting portion 21 to be easily displaced to the X-axis direction in accordance with the bending deformation of each of the beam portions 23. Note that, the spring constants of the entire beam portions 23 in the Z-axis direction are larger than the spring constants of the entire beam portions 23 in the X-axis direction.

Driving Portion

The driving portion 24 of each of the vibration structures 2 is disposed on the inside of the frame portion 211 of the detecting portion 21. When the upper surface of the base substrate 12 in the package 11 is set to be a reference surface, the driving portion 24 is formed into a plane-shape which extends along the reference surface. In the embodiment, the driving portion 24 is formed into a rectangular shape which extends along the shape of, for example, the frame portion 211 in planar view. In addition, the thickness of the driving portion 24 is the same as the thickness of the beam portion 25, and is smaller than the thickness of each of the detecting portion 21 and the beam portion 23. With this, it is possible to easily reduce variability in the mass of the driving portion 24 or variability in the elastic properties of the beam portion 25. Note that, the thickness of the driving portion 24 may be the same as the thickness of the detecting portion 21 or the beam portion 23.

First Beam Portion

The four beam portions 25 of each of the vibration structures 2 correspond to four corner portions of the frame portion 211 and four corner portions of the driving portion 24, and each of the four beam portions 25 connects the corresponding detecting portion 21 and the driving portion 24.

Each of the beam portions 25 is formed into a meandering shape which extends along the Y-axis direction while reciprocating in the X-axis direction. With this, it is possible to increase the length of the beam portions 25 while realizing miniaturization. In addition, it is possible to easily displace the driving portion 24 in the Z-axis direction in accordance with bending deformation of each of the beam portions 25 by increasing each of the beam portions 25.

Here, each of the beam portions 25 is provided with a portion (a first portion) which extends along in the X-axis direction, and a portion (a second portion) which extends along the Y-axis direction, but the length of the portion which extends along the X-axis direction is longer than the length of the portion which extends along the Y-axis direction. With this, the bending deformation of each of the beam portions 25 is reduced in the X-axis direction, and thus it is possible to reduce the displacement of the driving portion 24 in accordance with the bending deformation of each of the beam portions 25 in the X-axis direction. For this reason, it is possible to efficiently transfer a force influenced by the Coriolis effect (inertial force) which acts in the driving portion 24 in the X-axis direction to the detecting portion 21 via the beam portion 25. In addition, in each of the beam portions 25, while a portion of each of the beam portions 25, which extends along the X-axis direction is to be twisted and bent when the driving portion 24 is displaced to the Z-axis direction, a portion of each of the beam portions 25, which extends along the Y-axis direction is inclined to the Z-axis direction. At this time, the portion of each of the beam portions 25, which extends in the Y-axis direction is not significantly deformed; however, the portion of each of the beam portions 25 is inclined as described above, and thus functions as a displacement expanding mechanism for expanding the displacement of the driving portion 24 in the Z-axis direction in accordance with the length in the aforementioned portion.

In addition, by decreasing the length of the portion of each of the beam portions 25, which extends along the Y-axis direction, it is possible to reduce a gap between the portions of the beam portions 25, which extend along the X-axis direction, a gap between the portion of each of the beam portions 25, which extends along the X-axis direction and the detecting portion 21, and a gap between the portion of each of the beam portions 25, which extends along the X-axis direction and the driving portion 24. With this, it is possible to regulate or limit the bending deformation of each of the beam portions 25 in the Y-axis direction, and as a result, it is possible to reduce the displacement of the driving portion 24 in the Y-axis direction.

In addition, the length of each of the beam portions 25 is longer than the length of each of the beam portions 23. With this, each of the beam portions 25 is likely to be bent and deformed in the Z-axis direction compared to each of the beam portions 23. That is, the spring constant of each of the beam portions 25 in the Z-axis direction is smaller than the spring constant of each of the beam portions 23 in the Z-axis direction. In addition, from the aspect of the same purpose, the thickness of each of the beam portions 25 is smaller than the thickness of each of the beam portions 23. Meanwhile, since the number of the beam portions 25 is the same as the number of the beam portions 23, the spring constants of the entire beam portions 25 in the Z-axis direction is smaller than the spring constants of the entire beam portions 23 in the Z-axis direction.

Driving Fixed Electrode

Each of the two driving fixed electrode portions 3 is fixed on the bottom surface of the recessed portion 121 which is formed on the base substrate 12 in the package 11. Each of the driving fixed electrode portions 3 is disposed to face the corresponding driving portion 24 of the vibration structure 2 at a predetermined interval. Here, each of the driving fixed electrode portions 3 is disposed at a position overlapping the corresponding driving portion 24 in planar view. In the embodiment, each of the driving fixed electrode portions 3 is formed into a substantially annular shape along the outer periphery of the corresponding driving portion 24 in planar view.

The driving fixed electrode portion 3 is electrically connected to a terminal 32 which is provided on the outer side of the recessed portion 121 on the upper surface of the base substrate 12 via a wiring 31.

Examples of a constituent material of each of the driving fixed electrode portion 3, the wiring 31, and the terminal 32 include a transparent electrode material such as ITO (indium tin oxide), and a metallic material such as ZnO (zinc oxide), gold (Au), a gold alloy, platinum (Pt), aluminum (Al), an aluminum alloy, silver (Ag), a silver alloy, chromium (Cr), a chrome alloy, copper (Cu), molybdenum (Mo), niobium (Nb), tungsten (W), iron (Fe), titanium (Ti), cobalt (Co), zinc (Zn), and zirconium (Zr).

In addition, the driving fixed electrode portion 3, the wiring 31, and the terminal 32 are collectively formed by patterning a film, which is formed by using the aforementioned material and through a gas phase deposition method such as a sputtering method, a vapor deposition method, or through a photolithography method and an etching method. Meanwhile, in a case where the base substrate 12 is formed of a semiconductor material such as silicon, it is preferable that an insulating layer is provided between the driving fixed electrode portion 3, the wiring 31, the terminal 32, and the base substrate 12. Examples of the constituent material of the insulating layer include $SiO_2$ (silicon oxide), AlN (aluminum nitride), SiN (silicon nitride), and the like.

Detecting Fixed Electrode

Each of the four detecting fixed electrode portions 4 is bonded and fixed onto the upper surface of the base substrate 12 on the outer side of the recessed portion 121 of the base substrate 12 in the package 11. The four detecting fixed electrode portions 4 are formed of two detecting fixed electrode portions 4 for detecting the detected vibration of one vibration structure 2, and two detecting fixed electrode portions 4 for detecting the detecting vibration of the other vibration structure 2. The two detecting fixed electrode portions 4 for detecting the detecting vibration of the one vibration structure 2 are arranged in the Y-axis direction so as to interpose the other vibration structures 2 therebetween. In the same manner, the two detecting fixed electrode portions 4 for detecting the detecting vibration of the other vibration structure 2 are arranged in the Y-axis direction so as to interpose the other vibration structures 2 therebetween.

These four detecting fixed electrode portions 4 are collectively formed with two vibration structures 2 by processing (for example, an etching process) one substrate (for example, a silicone substrate).

Each of the detecting fixed electrode portions 4 is formed of a plurality of electrode fingers 41 and a plurality of electrode fingers 42 which are arranged to be adjacent to each other in the X-axis direction, and a connecting portion 43 which connects end portions to each other on the side opposite to the vibration structure 2 of a plurality of electrode fingers 42.

Each of the electrode fingers 41 and 42 extends along the Y-axis direction. Thus, each of the electrode fingers 41 faces one side surface of the electrode finger of the detecting movable electrode portion 212, and each of the electrode fingers 42 faces the other side surface of the electrode finger of the detecting movable electrode portion 212. When each of the electrode fingers 41 and 42 is disposed in this way, and thus the detecting portion 21 is displaced to the X-axis direction, and among an electrostatic capacity between the electrode finger 41 and the electrode finger of the detecting movable electrode portion 212, and an electrostatic capacity between the electrode finger 42 and the electrode finger of the detecting movable electrode portion 212, one electrostatic capacity is increased, and the other electrostatic capacity is decreased.

The connecting portion 43 has a function of securing conduction between the plurality of electrode fingers 42. With this, it is possible to enhance the reliability of the electrical connection between each of the electrode fingers 42 and a wiring 44 described below.

Such a detecting fixed electrode portion 4 is electrically connected to a terminal 45 which is provided on the outside of the recessed portion 121 on the upper surface of the base substrate 12 via the wiring 44. A constituent material and a method of forming the wiring 44 and the terminal 45 are the same those in the driving fixed electrode portion 3, the wiring 31, and the terminal 32.

Electrode for Driving Monitor

Each of the two electrodes for driving monitor 5 is bonded and fixed onto the bottom surface of the recessed portion 121 which is formed on the base substrate 12 in the package 11. Each of the electrodes for driving monitor 5 is disposed to face the corresponding driving portion 24 of the vibration structure 2 at a predetermined interval. Here, each of the electrodes for driving monitor 5 is disposed at a position overlapping the corresponding driving portion 24 in planar view. In the embodiment, each of the electrodes for driving monitor 5 is disposed on the inside of the driving fixed electrode portion 3 which is formed into the aforementioned annular shape in planar view, and overlaps the center portion of the corresponding driving portion 24.

Such an electrode for driving monitor 5 is electrically connected to the terminal 52 which is provided on the outside of the recessed portion 121 on the upper surface of the base substrate 12 via a wiring 51.

A constituent material and a method of forming the method of the electrode for driving monitor 5, the wiring 51, and the terminal 52 are the same those in the driving fixed electrode portion 3, the wiring 31, and the terminal 32.

The physical quantity sensor 10 which is configured as described above, is operated as follows.

A periodically changing voltage (for example, an AC voltage) is applied as the driving voltage between the driving fixed electrode portion 3 and the driving portion 24 which face each other. Then, an electrostatic attraction force having a strength that is periodically changed occurs between the driving fixed electrode portion 3 and the driving portion 24, and thereby, the driving portion 24 vibrates in the Z-axis direction in accordance with the elastic deformation of the beam portion 25.

At this time, a voltage which is applied between the driving fixed electrode portion 3 of one vibration structure 2 and the driving portion 24, and a voltage which is applied between the driving fixed electrode portion 3 of the other vibration structure 2 and the driving portion 24 have shifted phases by 180° in relation to each other. With this, the driving portion 24 of the aforementioned one vibration structure 2 and the driving portion 24 of the aforementioned vibration structure 2 vibrate through a reverse phase. That is, as illustrated in FIG. 4B, a state where the aforementioned one driving portion 24 is displaced to a direction α1 which corresponds to a +Z-axis direction, and the aforementioned other driving portion 24 is displaced to a direction α2 which corresponds to a −Z-axis direction, and a state where the aforementioned one driving portion 24 is displaced to a direction α2, and the aforementioned other driving portion 24 is displaced to a direction α1 are alternately repeated. With this, it is possible to reduce leakage vibration. Meanwhile, FIG. 4B illustrates a case where the driving portion 24 on the left side of the drawing is displaced to the direction α1, and the driving portion 24 on the right side of the drawing is displaced to the direction α2.

In addition, at this time, the electrostatic capacity between the electrode for driving monitor 5 and the driving portion 24 is detected, and then, based on the detection result, a driving voltage is controlled as required. Therefore, it is possible to control in such a manner that the vibration of the driving portion 24 becomes a desired vibration.

As described above, in the state of causing the driving portion 24 to vibrate, if the angular velocity about the Y-axis is applied to the physical quantity sensor 10, the Coriolis effect acts on the driving portion 24 in the X-axis direction, and thus the detecting portion 21 vibrates in the X-axis direction due to the action of the Coriolis effect. That is, as illustrated in FIG. 5A, a state where one detecting portion 21 is displaced to a direction β1 which corresponds to a +X-axis direction, and the other detecting portions 21 is displaced to a direction β2 which corresponds to a −X-axis direction, and a state where the aforementioned one detecting portion 21 is displaced to the direction β2, and the other detecting portion 21 is displaced to the direction β1 are alternately repeated. With this, the electrostatic capacity between the electrode fingers 41 and 42 of the detecting fixed electrode portion 4 and the electrode finger of the detecting movable electrode portion 212 is changed. Accordingly, it is possible to detect the angular velocity which is applied to the physical quantity sensor 10 based the electrostatic capacity.

At this time, among a gap g1 between the electrode finger 41 and the electrode finger of the detecting movable electrode portion 212, and a gap g2 between the electrode finger 42 and the electrode finger of the detecting movable electrode portion 212, one of the gaps is large and the other one is small. Therefore, regarding the electrostatic capacity between the electrode finger 41 and the electrode finger of the detecting movable electrode portion 212, and the electrostatic capacity between the electrode finger 42 and the electrode finger of the detecting movable electrode portion 212, when one electrostatic capacity is increased, the other electrostatic capacity is decreased. Therefore, it is possible to obtain a high output detection signal by differentially amplifying these electrostatic capacities. As a result, it is possible to detect the angular velocity with high accuracy.

According to the physical quantity sensor 10 as described above, in the Z-axis direction which is a direction of the driving vibration of the driving portion 24, the entirety of the beam portions 25 is likely to be more bent than the entirety of the beam portions 23, and thus it is possible to reduce the transfer of the driving vibration of the driving portion 24 to the detecting portion 21 and to efficiently excite the driving vibration on the driving portion 24 to vibrated. In addition, even though the cross-sectional shape of the beam portion 25 is formed into, for example, a parallelogram shape or a trapezoid shape other than the rectangular shape, the direction in which the unnecessary vibration occurs in the driving portion 24 corresponds to the Y-axis direction. Thus, although the unnecessary vibration is transferred to the detecting portion 21 from the driving portion 24, it is possible to reduce the occurrence of detection errors with little effect on the detection vibration of the detecting portion 21. In addition, in the X-axis direction which corresponds to the direction of the detecting vibration of the detecting portion 21, each of the beam portions 23 is likely to be bent, and thus it is possible to efficiently drive the detecting portion 21 to vibrate. As described, the physical quantity sensor element 1 and the physical quantity sensor 10 of the invention have the excellent detection accuracy.

In addition, the length of each of the beam portions 25 is longer than the length of each of the beam portions 23, and thus with a relatively simple configuration, it is possible that the spring constant of the beam portion 25 in the Z-axis direction is smaller than the spring constant of the beam portion 23 in the Z-axis direction.

Here, when the length of each of the beam portions 25 is set to be L1, and the length of each of the beam portions 23 is set to be L2, L1/L2 is preferably in a range of 2 times to 20 times, and more preferably in a range of 3 times to 10 times. Therefore, with a relatively simple configuration, it is possible that the spring constant of the beam portion 25 in the Z-axis direction is smaller than the spring constant of the beam portion 23 in the Z-axis direction while realizing miniaturization. Meanwhile, the length L1 is the sum of the length in the same direction of the portion extending along the X-axis direction and the length in the same direction of the portion extending along the Y-axis direction of the beam portion 25. In addition, the length L2 is the sum of the length in the same direction of the portion extending along the Y-axis direction and the length in the same direction of the portion extending along the X-axis direction of the beam portion 23.

Further, each of the beam portions 25 includes a portion which is formed into the meandering shape in planar view, and thus it is possible to efficiently reduce the spring constant each of the beam portions 25 in the Z-axis direction. In addition, it is possible to efficiently dispose each of the beam portions 25, and thereby to realize the miniaturization of the physical quantity sensor element 1.

Particularly, each of the beam portions 25 includes, as described above, a first portion which extends along the X-axis, and a second portion which extends along the Y-axis, and the length of the first portion is longer than the length of the second portion. For this reason, it is possible to more efficiently dispose each of the beam portions 25. In addition, the second portion is inclined in accordance with the bending deformation and the twist deformation of the first portion, and thus it is possible to expand amplitude (displacement in the Z-axis direction) of the driving vibration of the driving portion 24.

In addition, the number of the first portions in each of the beam portions 25 is four in FIG. 2, but is not limited thereto. For example, the number of the first portions may be two, three, or five or more, and is preferably two to four.

In addition, the thickness of each of the beam portions 25 is smaller than the thickness of each of the beam portions 23, and thus with a relatively simple configuration, it is possible to make the spring constants of the entire beam portions 25 in the Z-axis direction smaller than the spring constants of the entire beam portions 23 in the Z-axis direction. Here, when the thickness of each of the beam portions 23 is set to be t1, and the thickness of each of the beam portions 25 is set to be t2, t2/t1 is preferably within a range of 0.2 to 0.8, and is more preferably within a range of 0.4 to 0.7.

Further, as described, the spring constants of the entirety of the beam portions 25 in the Z-axis direction is preferably smaller than the spring constants of the entirety of the beam portions 23 in the Z-axis direction; however, when the spring constants of the entirety of the beam portions 25 in the Z-axis direction are set to be k1z, and the spring constants of the entirety of the beam portions 23 in the Z-axis direction are set to be k2z, it is preferable that a relationship expressed by $k1z/k2z \leq 1/10$ is established, and it is more preferable that a relationship expressed by $k1z/k2z \leq 1/100$ is established. With this, it is possible to efficiently excite the driving vibration on the driving portion 24. Further, it is possible to effectively reduce the transfer of the driving vibration of the driving portion 24 to the detecting portion 21. Meanwhile, from the aspect of the ease of miniaturization and manufacturing, it is preferable that a relationship expressed by $k1z/k2z$ is equal to or greater than 1/10000.

In addition, the width of each of the beam portions 23 is smaller than the thickness of each of the beam portions 23, and thus with a relatively simple configuration, it is possible to make the spring constants of the entire beam portions 23 in the X-axis direction smaller than the spring constants of the entire beam portions 23 in the Z-axis direction. When the width of each of the beam portions 23 is set to be W, and the thickness of each of the beam portions 23 is set to be t1, it is preferable that t1/W is within a range of 2 to 20, and it is more preferable that t1/W is within a range of 5 to 10.

Second Embodiment

Next, the second embodiment of the invention will be described.

Figure 6:
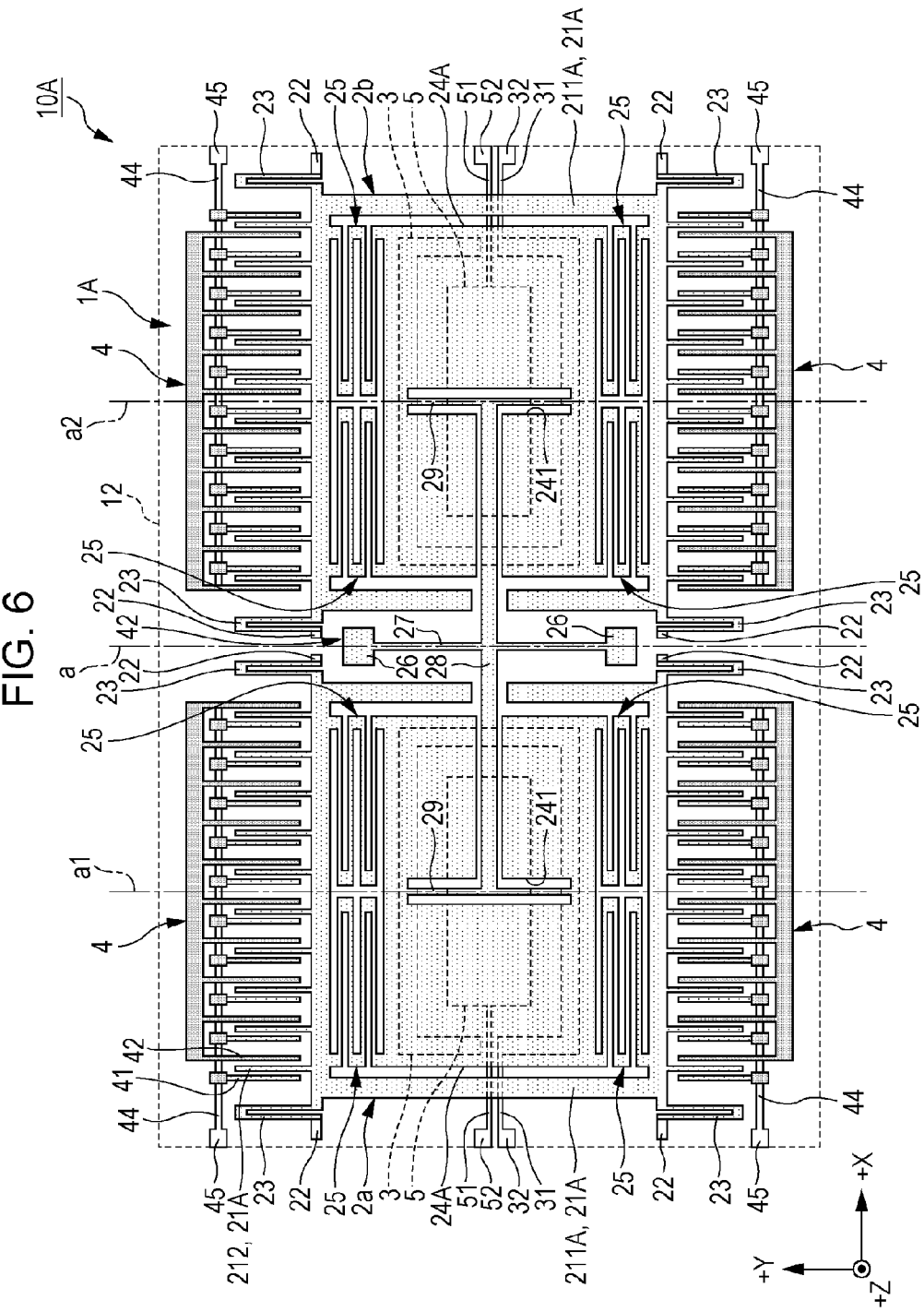
FIG. 6 is a plan view illustrating a physical quantity sensor according to the second embodiment of the invention.
Figure 7:
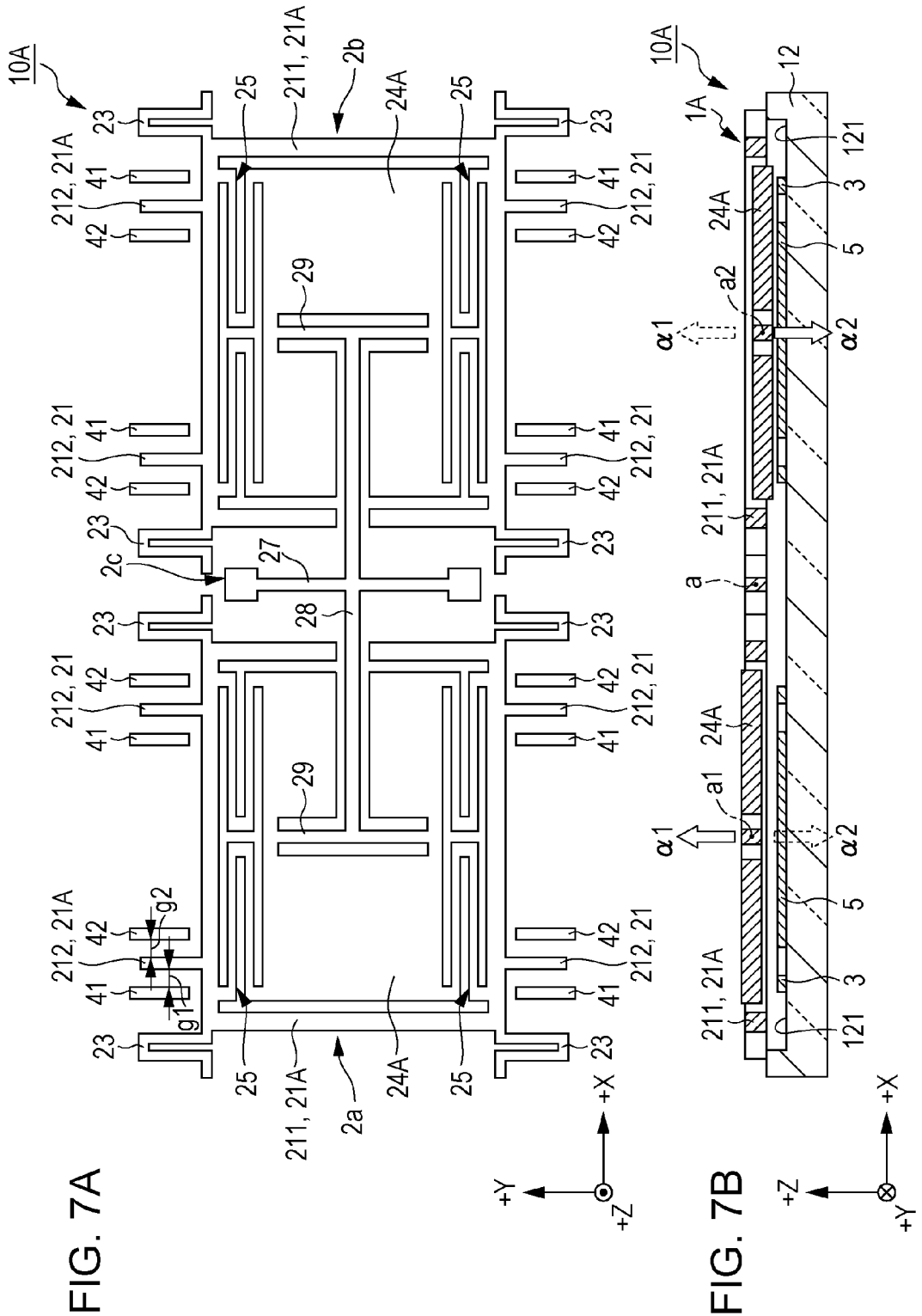
FIG. 7A and FIG. 7B are schematic diagrams for illustrating an operation of the physical quantity sensor (a state to which an angular velocity is not added) illustrated in FIG. 6.

FIG. 6 is a plan view illustrating the physical quantity sensor according to the second embodiment of the invention. In addition, FIG. 7 is a schematic diagram for illustrating an operation of the physical quantity sensor (a state to which an angular velocity is not added) illustrated in FIG. 6, and FIG. 7A is a plan view and FIG. 7B is a sectional view.

The description of the second embodiment is the same as that of the first embodiment described above except that the physical quantity sensor element is provided with a coupling structure for connecting two vibration structures to each other.

Note that, in the following description, regarding the second embodiment, the description will focus on the differences from the embodiment described above and the same matters will be omitted.

The physical quantity sensor element 1A as illustrated in FIG. 6 is provided with two vibration structures 2a and 2b, a coupling structure 2c for connecting two of the vibration structures 2a and 2b to each other, two driving fixed electrode portions 3 for exciting the driving vibration on the vibration structures 2a and 2b, four detecting fixed electrode portions 4 for detecting the detecting vibration of the vibration structures 2a and 2b, and two electrodes for driving monitor 5 for detecting a driving state of the vibration structures 2a and 2b.

The vibration structures 2a and 2b are arranged in the X-axis direction. The vibration structures 2a and 2b have the same configuration as each other except for being symmetrically disposed in FIG. 6, and each of the vibration structures 2a and 2b is provided with the detecting portion 21A, four fixing portions 22 which are fixed onto the base substrate 12 in the package 11, four beam portions 23 (a second beam portion) which connect a detecting portion 21A and the four fixing portions 22, a driving portion 24A, and four beam portions 25 (a first beam portion) which connect the detecting portion 21A and the driving portion 24A.

The detecting portion 21A is provided with a frame portion 211A and a detecting movable electrode portion 212 in the frame portion 211A.

The frame portion 211A is formed into a frame shape in which a part is chipped in the circumferential direction in planar view. Specifically, the frame portion 211 is formed of a pair of first portions which extend along the X-axis direction so as to be parallel to each other, the second portion which extends along the Y-axis direction and connects one side of the ends of the pair of the first portion to each other, and a pair of third portion which extend along the Y-axis direction so as to face each other from the other side of the ends of the pair of first portions.

The driving portion 24A is disposed on the inside of the frame portion 211A of the aforementioned detecting portion 21A. A beam portion 29 which extends along the Y-axis direction is provided in the driving portion 24A. Both ends of the beam portion 29 are fixed to the corresponding driving portion 24A.

The coupling structure 2c is disposed between two vibration structures 2a and 2b. This coupling structure 2c is provided with two fixing portions 26, a support beam portion 27 for connecting two fixing portions 26 to each other, the beam portion 29 which is provided in the driving portion 24A, a coupling portion 28 which is supported by the support beam portion 27 and couples the beam portions 29 of the vibration structures 2a and 2b with each other.

The two fixing portions 26 are arranged in the Y-axis direction. Then, the support beam portion 27 for connecting the two fixing portions 26 to each other extends in the Y-axis direction. In addition, the coupling portion 28 extends in the X-axis direction, and one end portion is connected to a middle portion of one beam portion 29 and the other end portion is connected to a middle portion of the other beam portion 29. In addition, in planar view, the coupling portion 28 and the support beam portion 27 intersect each other, and thus a middle portion of the coupling portion 28 is connected to a middle portion of the support beam portion 27.

As described above, in the physical quantity sensor 10A, the coupling portion 28 is connected to one driving portion 24A (a first mass portion) and the other driving portion 24A (a second mass portion), and thus, when these two driving portions 24A are caused to vibrate through a reverse phase in the Z-axis direction, it is possible that the two driving portions 24A are caused to stably vibrate.

Particularly, one end portion of the coupling portion 28 is connected to a portion in one driving portion 24A (the first mass portion), and the other end portion of the coupling portion 28 is connected to a portion in the other driving portion 24A (the second mass portion). In addition, the beam portion 29 of one driving portion 24A functions as a "first easily deformable portion" which is deformable so as to reduce the change of posture of the one driving portion 24A with respect to an XY plane corresponding to a reference surface. In the same manner, the beam portion 29 of the other driving portion 24A functions as a "second easily deformable portion" which is deformable so as to reduce the change of posture of the other driving portion 24A with respect to an XY plane corresponding to a reference surface.

Accordingly, when the two driving portions 24A are caused to vibrate through the reverse phase in the Z-axis direction, each of the beam portions 29 is deformed so as to reduce the change of the posture of the two driving portions 24A with respect to XY plane, and thus it is possible to reduce leakage vibration. From the above description, the physical quantity sensor element 1A and the physical quantity sensor 10A have the excellent detection accuracy.

Here, each of the beam portions 29 extends along the direction (the Y-axis direction) intersecting with the direction (the X-axis direction) in which the two driving portions 24A are arranged in planar view. With this, it is possible to reduce the change of the posture of the two driving portions 24A with respect to the XY plane by twisting each of the beam portions 29. As such, it is possible to reduce the change of the posture of the two driving portions 24A with respect to the XY plane with a relatively simple configuration.

In addition, each of the beam portions 29 is disposed at a position including the center portion of the corresponding driving portion 24A in planar view. Thus, it is possible to effectively reduce the change of the posture of the two driving portions 24A with respect to the XY plane.

Further, in planar view, the width of each of the beam portions 29 is smaller than the width of the coupling portion 28. With this, it is easy to twist the first easily deformable portion and the second easily deformable portion, and thus it is possible to effectively reduce the change of the posture of the first mass portion and the second mass portion with respect to the reference surface. In addition, it is possible to reduce undesirable deformation of the coupling portion 28 and to stabilize the vibration of the first mass portion and the second mass portion.

In addition, each of the driving portions 24A includes a gap portion 241 in which the beam portion 29 is disposed. Therefore, it is possible to collectively form two beam portions 29 with two driving portions 24A by processing one substrate. Each of the gap portions 241 prevents the coupling portion 28 from coming in contact with the driving portion 24A while allowing the beam portion 29 to be twisted. Note that, the gap portion 241 in one driving portion 24A forms a "first gap portion", and the gap portion 241 in the other driving portion 24A forms a "second gap portion".

In addition, in planar view, the middle portion of the coupling portion 28 is supported by the support beam portion 27, and thus it is possible to stably rotate the coupling portion 28 around the support beam portion 27 in accordance with the twist deformation the support beam portion 27. As a result, it is possible to stabilize the vibration of the two driving portions 24.

2. Electronic Equipment

Figure 8:
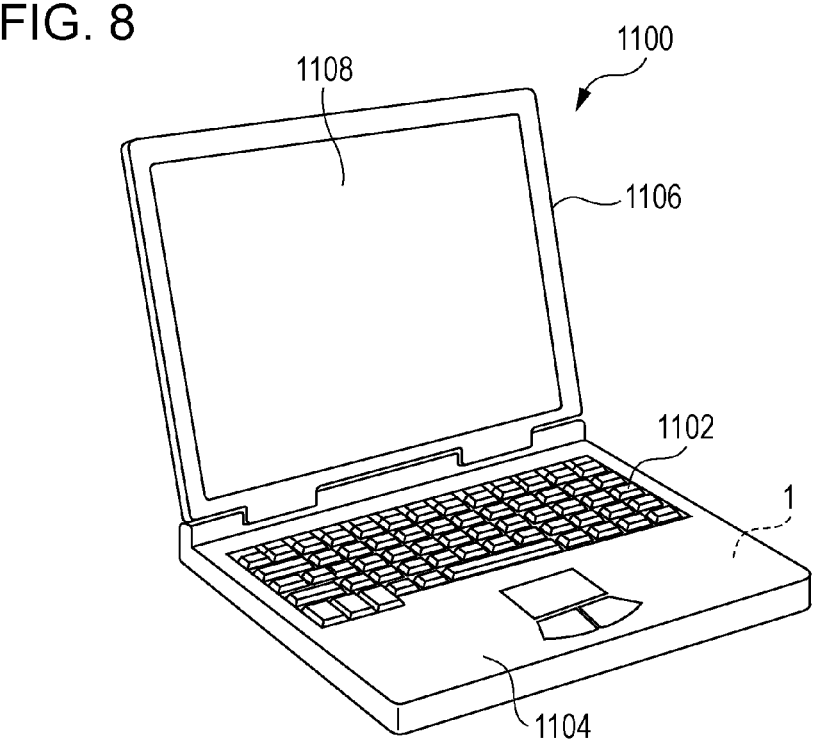
FIG. 8 is a schematic perspective view of a configuration of a mobile-type personal computer of an example of electronic equipment of the invention.
Figure 9:
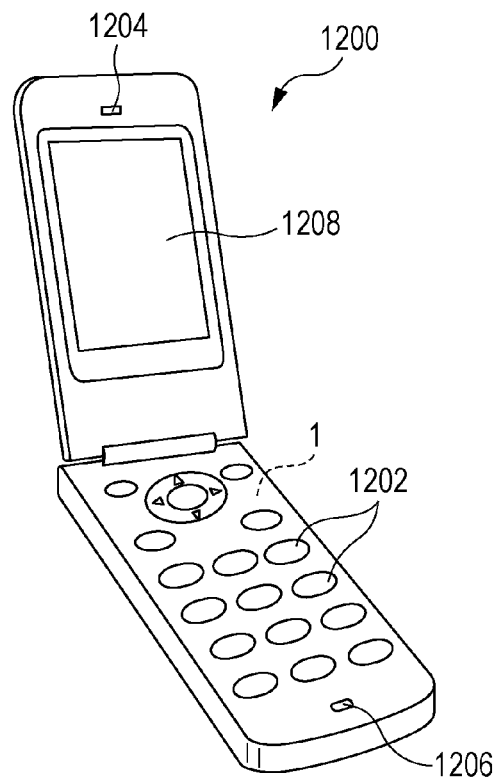
FIG. 9 is a schematic perspective view of a configuration of a mobile phone which is an example of the electronic equipment of the invention.
Figure 10:
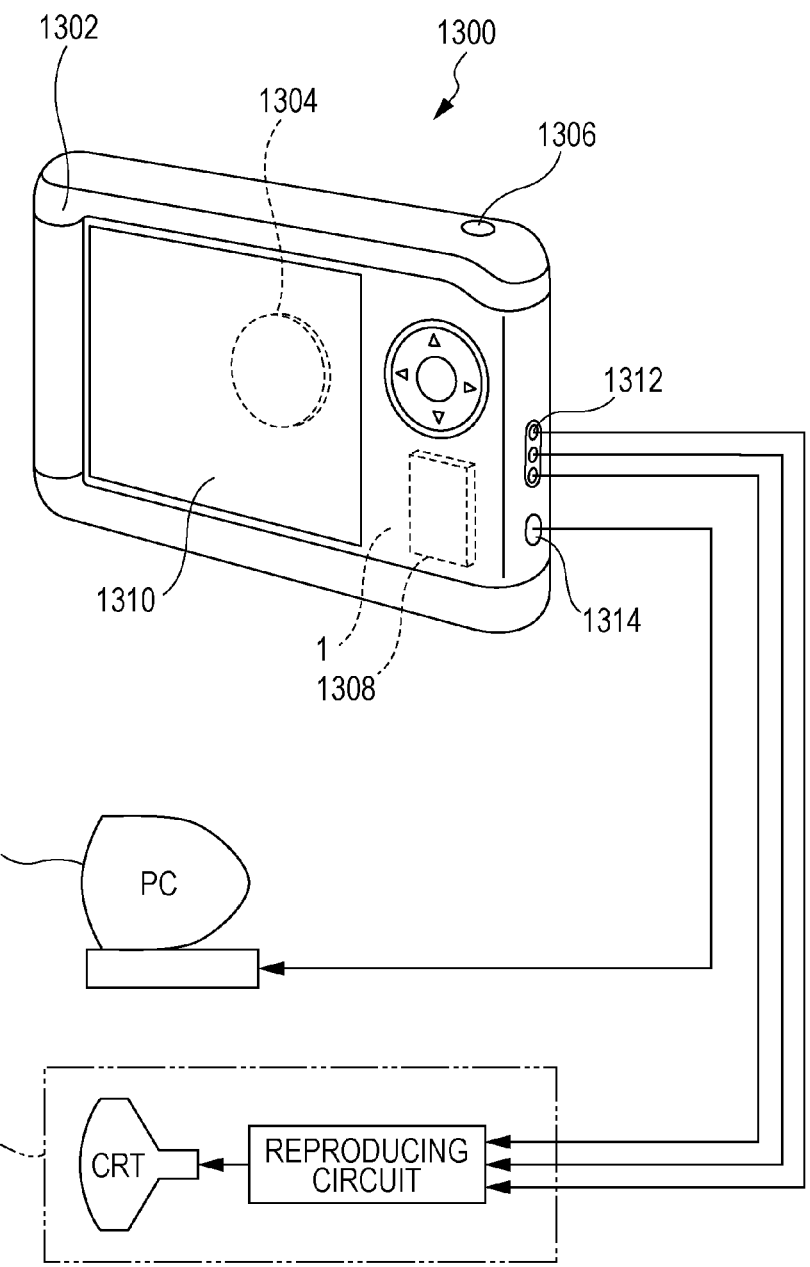
FIG. 10 is a perspective view of a configuration of a digital still camera which is an example of the electronic equipment of the invention.

Next, the electronic equipment using the physical quantity sensor element 1 will be specifically described based on FIG. 8 to FIG. 10.

FIG. 8 is a perspective view of a configuration of a mobile phone which is a mobile-type personal computer of the equipment of the invention.

In FIG. 8, a personal computer 1100 is formed of a main body portion 1104 which is provided with a keyboard 1102, and a display unit 1106 which is provided with a display 1108, and the display unit 1106 is rotatably supported with respect to the main body portion 1104 via a hinge structure. The physical quantity sensor element 1 which functions as a gyro sensor is built in the personal computer 1100.

FIG. 9 is a perspective view of a configuration of a mobile phone which is an example of the equipment of the invention.

In FIG. 9, a mobile phone 1200 is provided with a plurality of operation buttons 1202, an ear piece 1204, and a mouth piece 1206, and a display 1208 is disposed between the operation button 1202 and the ear piece 1204. The physical quantity sensor element 1 which functions as a gyro sensor is built in the mobile phone 1200.

FIG. 10 is a perspective view of a configuration of a digital still camera which is an example of the equipment of the invention. In addition, in FIG. 10 simply illustrates the connection to the external device. Here, in a general camera, a silver salt film is exposed to the light by an optical image of the object, whereas in a digital still camera 1300, the optical image of the object is by photoelectrically converted into an imaging signal (an image signal) by using an imaging element such as a charge coupled device (CCD).

The display is provided on the back surface of the case (body) 1302 in the digital still camera 1300, and is configured to display based on the image signal by using the CCD, and the display 1310 is functions as a finder for displaying the object as an electronic image.

In addition, a light receiving unit 1304 which includes an optical lens (an imaging optical system), the CCD, and the like is provided on the front side (on the rear surface side in FIG. 10) of the case 1302.

When a user confirms a target image displayed on the display, and presses a shutter button 1306, an image signal of the CCD is transferred and stored in a memory 1308.

In addition, in the digital still camera 1300, a video signal output terminal 1312, and an input and output terminal 1314 for data communication are provided on the side surface of the case 1302. In addition, as illustrated in FIG. 10, a television monitor 1430 is connected to the video signal output terminal 1312, and a personal computer 1440 is connected to the input and output terminal 1314 for data communication, as required. Further, through a predetermined operation, the image signal stored in the memory 1308 is output from the television monitor 1430 or the personal computer 1440.

The physical quantity sensor element 1 which functions as the gyro sensor is built in the digital still camera 1300.

Note that, in addition to the personal computer (a mobile-type personal computer) in FIG. 8, the mobile phone in FIG. 9, and the digital still camera in FIG. 10, examples of the electronic equipment which is provided with the physical quantity sensor element of the invention include an ink jet ejecting device (for example, an ink jet printer), a laptop personal computer, a television, a video camera, a video tape recorder, a car navigation device, a pager, an electronic notebook (including communication functions), an electronic dictionary, an electronic calculator, an electronic game device, a word processor, a workstation, a videophone, a security television monitor, an electronic binocular, a POS terminal, medical equipment (for example, an electronic thermometer, a blood pressure monitor, a blood glucose meter, an electrocardiogram measuring device, an ultrasonic diagnostic device, and an electronic endoscope), a fish finder, various measuring devices, an instrument (for example, a vehicle, an aircraft, and a ship gauge), a flight simulator, and the like.

3. Movable Body

Figure 11:
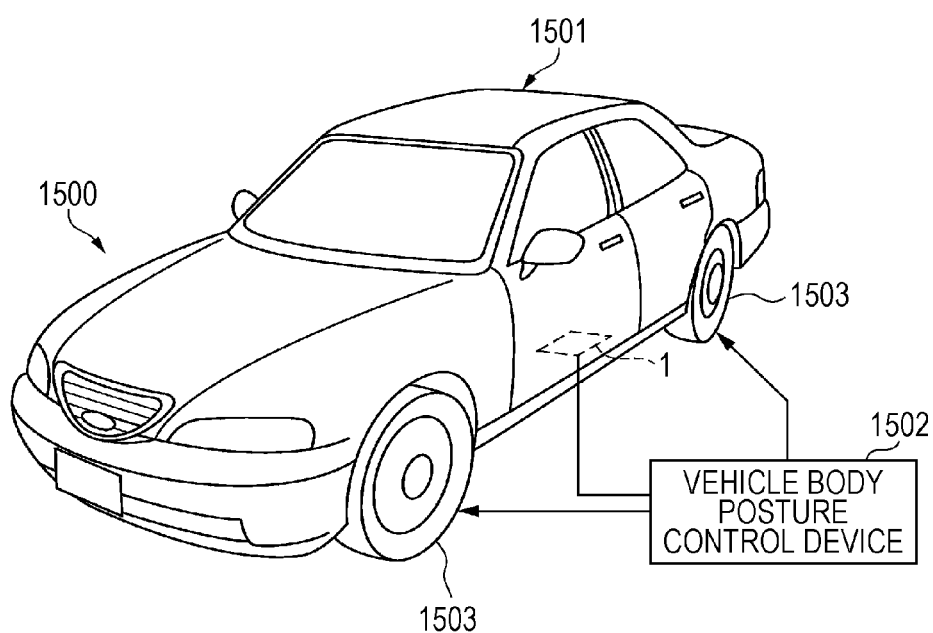
FIG. 11 is a perspective view of a configuration of a vehicle which is an example of a movable body of the invention.

Next, a movable body by using the physical quantity sensor element 1 will be specifically described based on FIG. 11.

FIG. 11 is a perspective view of a configuration of a vehicle which is an example of a movable body of the invention.

The physical quantity sensor element 1 which functions as a gyro sensor is built into a vehicle 1500, and it is possible to detect posture of a vehicle body 1501 by the physical quantity sensor element 1. The detected signal from the physical quantity sensor element 1 is supplied a vehicle body posture control device 1502, and the vehicle body posture control device 1502 detects the posture of the vehicle body 1501 based on the detected signal, and thus it is possible to control the hardness of suspension according to a detection result and to control the brake of each of wheels 1503. In addition, it is possible to control the posture by using a bipedal robot and a radio-controlled helicopter. As described above, in order to realize the posture control of the various movable bodies, the physical quantity sensor element 1 is built in the vehicle 1500.

As described above, the physical quantity sensor element, the physical quantity sensor, the electronic equipment, and the movable body of the invention are described with reference to the drawings of the embodiments; however, the invention is not limited thereto. For example, the configuration of each portion can be replaced with any configuration which exhibits the same function in the invention. In addition, any other components may be added to the invention. Further, the invention may be made by combining two or more of configurations (features) in the above embodiments.

The entire disclosure of Japanese Patent Application No. 2014-181048, filed Sep. 5, 2014 is expressly incorporated by reference herein.

What is claimed is:

1. A physical quantity sensor element comprising:
    a driving portion which vibrates in a first direction along a first axis orthogonal to a reference surface, the driving portion having a first side, a second side, a third side, and a fourth side, the first side opposing the third side and the second side opposing the fourth side;
    a detecting portion which vibrates in a second direction along a second axis in the reference surface due to an inertial force acting on the driving portion, the detecting portion having a first side, a second side, a third side, and a fourth side that coincide with the first side, the second side, the third side, and the fourth side of the driving portion;
    a first beam portion which connects the driving portion and the detecting portion with each other, the first beam portion connecting the driving portion and the detecting portion only on the respective first sides and third sides of the driving portion and the detecting portion;
    a fixing portion fixed to a base substrate;
    a second beam portion which connects the detecting portion and the fixing portion, the second beam portion connecting the detecting portion only on the second side and the fourth side;
    a detecting fixed electrode portion disposed on the base substrate along the first side and the third side of the detecting portion; and
    a driving fixed electrode portion disposed on a recessed portion in the base substrate,
    wherein the driving fixed electrode portion is connected to a terminal along an axis parallel to the second axis and the detecting fixed electrode portion is connected to a terminal along an axis parallel to the second axis,
    wherein the second axis is parallel to an axis extending orthogonal to the second side and the fourth side of the detecting portion,
    wherein a spring constant of the first beam portion in the first direction is smaller than a spring constant of the second beam portion in the first direction, and
    wherein a spring constant of the second beam portion in the first direction is greater than a spring constant of the second beam portion in the second direction.

2. The physical quantity sensor element according to claim 1,
    wherein when the spring constant of the first beam portion in the first direction is set to be k1$z$, and the spring constant of the second beam portion in the first direction is set to be k2$z$, a relationship expressed by k1$z$/k2$z \leq 1/10$ is established.

3. The physical quantity sensor element according to claim 1,
    wherein a length of the first beam portion is longer than a length of the second beam portion.

4. The physical quantity sensor element according to claim 1,
    wherein the first beam portion includes a portion which is formed into a meandering shape in planar view when seen from the first direction.

5. The physical quantity sensor element according to claim 4,
wherein the first beam portion includes a first portion which extends along the second axis, and a second portion which extends along a third axis orthogonal to the second axis in the reference surface, and
wherein a length of the first portion is longer than a length of the second portion.

6. The physical quantity sensor element according to claim 1,
wherein a thickness of the first beam portion is smaller than a thickness of the second beam portion.

7. The physical quantity sensor element according to claim 1,
wherein a width of the second beam portion is smaller than a thickness of the second beam portion.

8. A physical quantity sensor comprising:
the physical quantity sensor element according to claim 1; and
a package which stores the physical quantity sensor element.

9. A vehicle comprising the physical quantity sensor element according to claim 1.

10. The physical quantity sensor element of according to claim 1,
wherein the first side of the driving portion and the first side of the detecting portion face each other,
the second side of the driving portion and the second side of the detecting portion face each other,
the third side of the driving portion and the third side of the detecting portion face each other, and
the fourth side of the driving portion and the fourth side of the detecting portion face each other.

* * * * *